United States Patent
Park (10) Patent No.: US 8,462,447 B2
(45) Date of Patent: Jun. 11, 2013

(54) PHOTOGRAPHIC LENS OPTICAL SYSTEM

(75) Inventor: Hyoung Bae Park, Seoul (KR)

(73) Assignee: Kolen Co., Ltd. (KR)

( * ) Notice: Subject to any disclaimer, the term of this patent is extended or adjusted under 35 U.S.C. 154(b) by 117 days.

(21) Appl. No.: 13/030,673

(22) Filed: Feb. 18, 2011

(65) Prior Publication Data

US 2011/0199691 A1   Aug. 18, 2011

(30) Foreign Application Priority Data

Feb. 18, 2010   (KR) .......................... 10-2010-0014742

(51) Int. Cl.
*G02B 13/18* (2006.01)

(52) U.S. Cl.
USPC .......................................... 359/715; 359/708

(58) Field of Classification Search
USPC .......................................... 359/642, 708, 715
See application file for complete search history.

(56) References Cited

U.S. PATENT DOCUMENTS

| | | | |
|---|---|---|---|
| 7,355,801 B2 * | 4/2008 | Chen et al. | 359/773 |
| 7,558,005 B2 * | 7/2009 | Yasuhiko | 359/715 |
| 2009/0109549 A1 * | 4/2009 | Yasuhiko | 359/715 |

* cited by examiner

*Primary Examiner* — James Greece
(74) *Attorney, Agent, or Firm* — St. Onge Steward Johnston & Reens LLC (57) ABSTRACT

A lens optical system including, in a sequence from an object to an imaging device on which an image of the object is formed; a first lens having a a positive refractive power; a second lens having negative refractive power; a third lens having a a positive refractive power; and a fourth lens having a negative refractive power and an incident surface facing the object is concave and an exit surface facing the imaging device has an inflection point.

13 Claims, 10 Drawing Sheets

PHOTOGRAPHIC LENS OPTICAL SYSTEM

CROSS-REFERENCE TO RELATED PATENT APPLICATION

This application claims the benefit of Korean Patent Application No. 10-2010-0014742, filed on Feb. 18, 2010, in the Korean Intellectual Property Office, the disclosure of which is incorporated herein in its entirety by reference.

BACKGROUND OF THE INVENTION

1. Field of the Invention

The present invention relates to lens optical systems, and more particularly, to lens optical systems for compact camera modules that can be applied to cellular phones.

2. Description of the Related Art

Due to the recent convergence trends in appliances, cameras are converged to cellular phones, and the cellular phones mounted with cameras are widely supplied. Cellular phones have a compact, portable size and thus cameras to be converged to the cellular phones also need to be compact and show high performance at the same time.

In general, a lens optical system of a camera is formed of spherical glass lenses to obtain excellent optical performance, such as aberration correction, for example. When using a spherical glass to provide excellent optical performance, six or seven spherical glass lenses need to be used.

Also, high-quality images are realized due to the development of solid-state imaging devices, such as a charge-coupled device (CCD) or a complementary metal-oxide semiconductor (CMOS) image sensor, for example.

However, when six to seven spherical glass lenses are used, this large number of lenses is an obstacle to providing a compact size appliance, and the spherical glass lenses increase processing costs.

In addition, due to the characteristics of camera lenses, the size of lenses is sequentially increased toward an imaging device in order to secure a light path. The size of lenses affects the size of phone cameras, and thus the size of lenses needs to be reduced to match the size of subcompact cellular phones, and lenses having a high resolution and high performance need to be realized at the same time.

SUMMARY OF THE INVENTION

One or more embodiments of the present invention provide lens optical systems with excellent optical performance and compact sizes.

According to an aspect of the present invention, there is provided a lens optical system comprising, in a sequence from an object to an imaging device on which an image of the object is formed; a first lens having a positive refractive power; a second lens having negative refractive power; a third lens having a positive refractive power; and a fourth lens having a negative refractive power and an incident surface facing the object is concave and an exit surface facing the imaging device has an inflection point.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
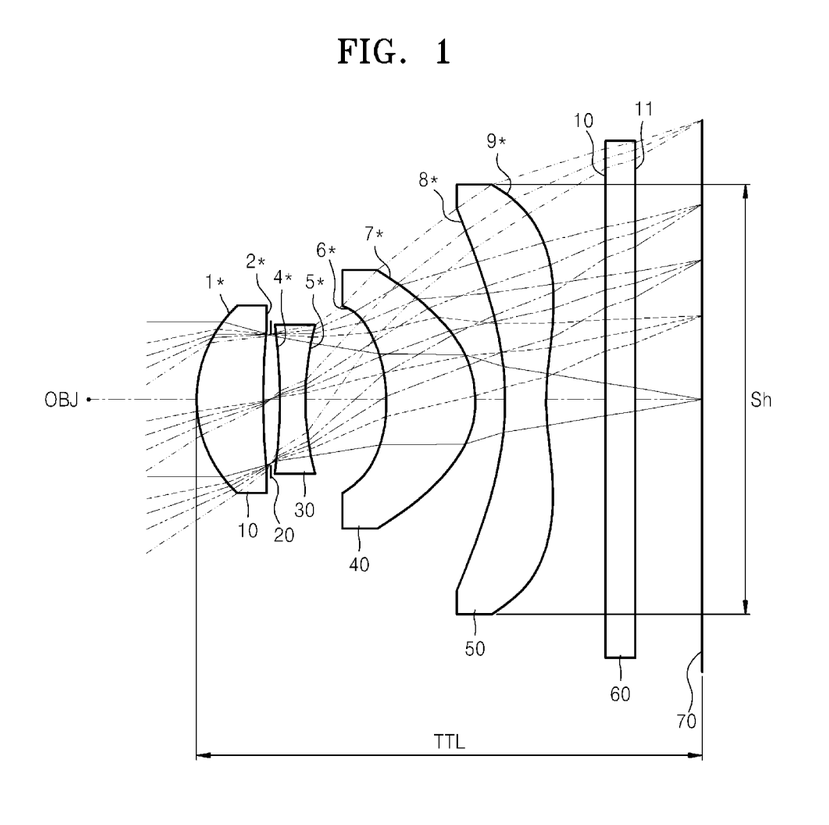
FIG. 1 is a longitudinal cross-sectional view illustrating an arrangement of elements of a lens optical system according to an embodiment of the present invention.

FIG. 1 is a longitudinal cross-sectional view illustrating an arrangement of elements of a lens optical system according to an embodiment of the present invention. In this specification, three embodiments of the lens optical system will be described; lens optical systems of the three embodiments include identical elements including aspherical surfaces and having varying design parameters.

Referring to FIG. 1, the lens optical system includes a first lens 10, a second lens 30, a third lens 40, and a fourth lens 50 sequentially arranged from an object OBJ, between the object OBJ and an imaging device 70, on which an image of the object OBJ is formed. Also, an aperture diaphragm 20 selectively converging light incident from the fourth lens 50 is included between the first lens 10 and the second lens 30. An infrared blocking unit 60 may be further formed between the fourth lens 50 and the imaging device 70. The positions of the aperture diaphragm 20 and the infrared blocking unit 60 are not limited as illustrated in FIG. 1. The imaging device 70 may be a charge-coupled device (CCD) sensor or a complementary metal-oxide semiconductor (CMOS) sensor or the like.

The first lens 10 has a positive refractive power, the second lens 30 has a negative refractive power, the third lens 40 has a positive refractive power, and fourth lens 50 has a negative refractive power. The first lens 10 may be convex toward the object OBJ. The first lens 10 may be concave toward the imaging device 70. The second lens 30 may be concave toward the object OBJ. The second lens 30 may be concave toward the imaging device 70. The third lens 40 may be concave toward the object OBJ. The third lens 40 may be convex toward the imaging device 70. The fourth lens 50 may be concave toward the object OBJ. An exit surface 9* of the fourth lens facing the imaging device 70 may have an inflection point. The exit surface 9* of the fourth lens 50 is concave at its center portion toward the imaging device 70 and becomes convex at a portion farther from the center portion toward two boundaries thereof. Accordingly, the fourth lens 50 is inclined toward the object OBJ, and thus a height Sh thereof is reduced as compared to that of the related art, and thus the size of the fourth lens 50 is reduced accordingly, which reduces a total length TTL, thereby forming an optical lens system having a compact size. The height Sh denotes a height of the fourth lens 50, and the total length TTL denotes a straight-line distance between an incident surface 1* of the first lens 10 and the imaging device 70.

The first lens 10, the second lens 30, the third lens 40, and the fourth lens 50 respectively include an incident surface and exit surface. At least one of the incident surface and exit surface of each of the lens 10, the second lens 30, the third lens 40, and the fourth lens 50 is aspherical. The first lens 10, the second lens 30, the third lens 40, and the fourth lens 50 may be formed of a plastic. The second lens 30 and the third lens 40 function as correction lenses.

The lens optical system, according to the current embodiment of the present invention, with the above-described configuration satisfies either Inequality 1 or Inequality 2 below.

$$0.5 < TTL/f > 1.5 \quad (1)$$

where f denotes a focal length of the entire lens optical system including the first lens 10 through the fourth lens 50, and the total length TTL denotes a straight-line distance from the incident surface 1* of the first lens 10 to the imaging device 70. Inequality 1 is a condition to obtain a compact lens optical system. When TTL/f approaches an upper limit of 1.5, spherical aberration of the lens optical system may be reduced but it is difficult to obtain a compact lens optical system. On the other hand, when TTL/f approaches a lower limit of 0.5, a compact lens optical system may be obtained but it is difficult to correct spherical aberration.

Table 1 below shows values of Inequality 1 corresponding to focal lengths f and total lengths TTL of the lens optical system according to the three embodiments of the present invention.

TABLE 1

|  | Total length (TTL) | Focal length (f) | Inequality 1 |
|---|---|---|---|
| Embodiment 1 | 5.149 | 4.424 | 1.163 |
| Embodiment 2 | 5.149 | 4.399 | 1.170 |
| Embodiment 3 | 4.101 | 3.504 | 1.170 |

As shown in Table 1, the values of Inequality 1 are not closer to either the lower or the upper limit but are in the middle. Thus, the lens optical systems can be reduced to compact sizes and furthermore, spherical aberration may be corrected.

$$1.0 < Sh/|f4| < 2.5 \quad (2)$$

where f4 denotes a focal length of the fourth lens 50, and Sh denotes the height of the fourth lens 50. Inequality 2 also is a condition to obtain a compact lens optical system. When Sh/|f4| approaches an upper limit of 2.5, spherical aberration of the lens system may be reduced but a compact lens optical system is difficult to be obtained. On the other hand, when Sh/|f4| approaches a lower limit of 1.0, a compact lens optical system may be obtained but spherical aberration may be difficult to be corrected.

Table 2 below shows values of Inequality 2 corresponding to the focal length f4 of the fourth lens 50 and the height Sh of the fourth lens 50 according to the three embodiments of the present invention.

TABLE 2

|  | Height of the fourth Lens (Sh) | Focal length of the fourth lens (f4) | Inequality 2 |
|---|---|---|---|
| Embodiment 1 | 4.390 | −2.450 | 1.791 |
| Embodiment 2 | 4.390 | −2.450 | 1.791 |
| Embodiment 3 | 3.496 | −1.951 | 1.791 |

As shown in Table 2, the values of Inequality 2 are not inclined to either the lower or the upper limit but are in the middle. Thus, the lens systems can be reduced to compact sizes and furthermore, spherical aberration may be corrected.

Next, the lens optical systems according to the three embodiments of the present invention will be described in detail with reference to lens data and the drawings.

Table 3 below shows optical data of elements of the lens optical system according to an embodiment of the present invention.

TABLE 3

|  | Surface | r | t | $N_d$ | $V_d$ |
|---|---|---|---|---|---|
| First lens | 1* | 1.421 | 0.679 | 1.54 | 56.09 |
|  | 2* | 16.358 | 0.060 |  |  |
| Aperture |  | ∞ | 0.065 |  |  |
| Second lens | 4* | −11.759 | 0.300 | 1.63 | 23.40 |
|  | 5* | 4.336 | 0.826 |  |  |
| Third lens | 6* | −1.878 | 0.913 | 1.54 | 56.09 |
|  | 7* | −0.878 | 0.309 |  |  |
| Fourth lens | 8* | −2.935 | 0.412 | 1.53 | 55.72 |
|  | 9* | 2.427 | 0.600 |  |  |
| Infrared blocking unit | 10 | ∞ | 0.300 | 1.51 | 64.19 |
|  | 11 |  | 0.688 |  |  |
| Imaging device |  | ∞ |  |  |  |

In Table 3, r denotes a radius of curvature, t denotes a lens thickness, Nd denotes a refractive index of lenses measured at a d-line, and Vd denotes an Abbe's number defined in Equation 1 below. In Table 3, Tables 4 and 5 below, an asterisk * of the number of lens surfaces denotes that a corresponding lens surface is aspherical. The curvature radius r and the lens thickness t are measured in mm.

$$V_d = \frac{N_d - 1}{N_F - N_C} \quad \text{[Equation 1]}$$

where $N_F$ denotes a refractive index of a lens measured at an f-line, and $N_C$ denotes a refractive index of a lens measured at a C-line.

Also, the aspherical lens surfaces of the lens optical system according to the current embodiment of the present invention satisfy an aspherical surface equation of Equation 2.

$$Z = \frac{Y^2}{R(1 + \sqrt{1 - (1+K)Y^2/R^2})} + AY^4 + BY^6 + CY^8 + DY^{10} + EY^{12} + FY^{14} + GY^{16} + HY^{18} + JY^{20} \quad \text{[Equation 2]}$$

where Z denotes a distance from an vertex of a lens along an optical axis direction, and Y denotes a distance in a direction vertical to the optical axis, R denotes a radius of curvature, K denotes a conic constant, and A, B, C, D, E, F, G, H, and J each denote aspherical coefficients.

When the lens optical system according to the current embodiment of the present invention satisfies Inequality 1, Inequality 2, Equation 1, and Equation 2, an aperture ratio $F_{no}$ is 2.8, and a focal length f is 4.424 mm.

Tables 4 and 5 below show conic constants and aspherical coefficients of each of the lenses of the lens optical system according to the current embodiment of the present invention.

TABLE 4

| Surface | K | A | B | C | D |
|---|---|---|---|---|---|
| 1* | 0.0697 | 0.0093 | 0.0186 | 0.0036 | 0.0229 |
| 2* | — | 0.1047 | −0.1177 | 0.1392 | 0.1168 |
| 4* | — | 0.0401 | −0.0173 | 0.0346 | −0.4145 |
| 5* | 24.4531 | 0.0876 | −0.1016 | 0.1181 | −0.3328 |
| 6* | 2.5019 | −0.0734 | −0.0317 | 0.0719 | −0.0041 |
| 7* | −3.0686 | −0.2335 | 0.1382 | −0.0790 | 0.0110 |
| 8* | −0.7276 | 0.0099 | 0.0058 | −0.0014 | −4.2964e− |
| 9* | −32.6155 | −0.0605 | 0.0144 | −0.0029 | 0.0002 |

TABLE 5

| E | F | G | H | J |
|---|---|---|---|---|
| −0.0218 | −0.0367 | 0.1253 | −0.0676 | — |
| −0.4494 | 0.2110 | 4.8442e−009 | 3.0841e−009 | — |
| 0.1427 | 0.9592 | −0.3144 | −1.4724 | — |
| 0.3472 | −0.2414 | 0.3082 | −0.4769 | — |
| −0.0607 | −0.0027 | 0.0773 | −0.0245 | — |
| 0.0066 | −0.0005 | −0.0012 | 0.0003 | — |
| 4.3905e− | 1.1458e−006 | 2.3639e−007 | 2.1327e−008 | — |
| 1.1281e− | −7.2615e− | −3.4034e−007 | −1.0779e−008 | — |

Table 6 below shows optical data of elements of the lens optical system according to another embodiment of the present invention.

TABLE 6

| | Surface | r | t | $N_d$ | $V_d$ |
|---|---|---|---|---|---|
| First lens | 1* | 1.421 | 0.678 | 1.54 | 56.09 |
| | 2* | 16.358 | 0.060 | | |
| Aperture | | ∞ | 0.065 | | |
| Second lens | 4* | −11.759 | 0.300 | 1.63 | 23.40 |
| | 5* | 4.336 | 0.826 | | |
| Third lens | 6* | −1.878 | 0.913 | 1.54 | 56.09 |
| | 7* | −0.878 | 0.309 | | |
| Fourth lens | 8* | −2.935 | 0.412 | 1.53 | 55.72 |
| | 9* | 2.471 | 0.600 | | |
| Infrared blocking unit | 10 | ∞ | 0.300 | 1.51 | 64.19 |
| | 11 | | 0.688 | | |
| Imaging | | ∞ | | | |

In Table 6, r denotes a radius of curvature, t denotes a lens thickness, $N_d$ denotes a refractive index of lenses measured at a d-line, and $V_d$ denotes an Abbe's number defined in Equation 1. In Table 6 and Tables 7 and 8 below, an asterisk * of the number of lens surfaces denotes that a corresponding lens surface is aspherical. The curvature radius r and the lens thickness t are measured in mm.

Also, the aspherical lens surfaces of the lens optical system according to the current embodiment of the present invention satisfy the aspherical surface equation of Equation 2.

When the lens optical system according to the current embodiment of the present invention satisfies Inequality 1, Inequality 2, Equation 1, and Equation 2, an aperture ratio $F_{no}$ is 2.8, and a focal length f is 4.399 mm.

Tables 7 and 8 below show conic constants and aspherical coefficients of each of the lenses of the lens optical system according to the embodiment of the present invention.

TABLE 7

| Surface | K | A | B | C | D |
|---|---|---|---|---|---|
| 1* | 0.0697 | 0.0093 | 0.0186 | 0.0036 | 0.0229 |
| 2* | — | 0.1047 | −0.1177 | 0.1392 | 0.168 |
| 4* | −732.6816 | 0.0401 | −0.0173 | 0.0346 | −0.4145 |
| 5* | 24.4531 | 0.0876 | −0.1016 | 0.1181 | −0.3328 |
| 6* | 2.5019 | −0.0734 | −0.0317 | 0.0719 | −0.0041 |

TABLE 7-continued

| Surface | K | A | B | C | D |
|---|---|---|---|---|---|
| 7* | −3.0686 | −0.2335 | 0.1382 | −0.0790 | 0.0110 |
| 8* | −0.7276 | 0.0099 | 0.0058 | −0.0014 | −4.2964e−005 |
| 9* | −32.6155 | −0.0605 | 0.0144 | −0.0029 | 0.0002 |

TABLE 8

| E | F | G | H | J |
|---|---|---|---|---|
| −0.0218 | −0.0367 | 0.1253 | −0.0676 | — |
| −0.4494 | 0.2110 | 4.8442e−009 | 3.0841e−009 | — |
| 0.1427 | 0.9592 | −0.3144 | −1.4724 | — |
| 0.3472 | −0.2414 | 0.3082 | −0.4769 | — |
| −0.0607 | −0.0027 | 0.0773 | −0.0245 | — |
| 0.0066 | −0.0005 | −0.0012 | 0.0003 | — |
| 4.3905e−006 | 1.1458e−006 | 2.3639e−007 | 2.1327e−008 | — |
| 1.1281e−005 | −7.2615e−007 | −3.4034e−007 | −1.0779e−008 | — |

Table 9 below shows optical data of elements of the lens optical system according to another embodiment of the present invention.

TABLE 9

| | Surface | r | t | $N_d$ | $V_d$ |
|---|---|---|---|---|---|
| First lens | 1* | 1.132 | 0.540 | 1.54 | 56.09 |
| | 2* | 13.029 | 0.047 | | |
| Aperture | | ∞ | 0.051 | | |
| Second lens | 4* | −9.366 | 0.238 | 1.63 | 23.40 |
| | 5* | 3.453 | 0.658 | | |
| Third lens | 6* | −1.496 | 0.727 | 1.54 | 56.09 |
| | 7* | −0.699 | 0.246 | | |
| Fourth lens | 8* | −2.338 | 0.328 | 1.53 | 55.72 |
| | 9* | 1.968 | 0.477 | | |
| Infrared blocking unit | 10 | ∞ | 0.238 | 1.51 | 64.19 |
| | 11 | | 0.542 | | |
| Imaging | | ∞ | | | |

In Table 9, r denotes a radius of curvature, t denotes a lens thickness, $N_d$ denotes a refractive index of lenses measured at a d-line, and $V_d$ denotes an Abbe's number defined in Equation 1. In Table 9 and Tables 10 and 11 below, an asterisk * of the number of lens surfaces denotes that a corresponding lens surface is aspherical. The radius of curvature r and the lens thickness t are measured in mm.

Also, the aspherical surfaces of the lens optical system according to the current embodiment of the present invention satisfy the aspherical surface equation of Equation 2.

When the lens optical system according to the current embodiment of the present invention satisfies Inequality 1, Inequality 2, Equation 1, and Equation 2, an aperture ratio $F_{no}$ is 2.8, and a focal length f is 3.504 mm.

Tables 10 and 11 below show conic constants and aspherical coefficients of each of the lenses of the lens optical system according to the current embodiment of the present invention.

TABLE 10

| Surface | K | A | B | C | D |
|---|---|---|---|---|---|
| 1* | 0.067 | 0.0188 | 0.0598 | 0.0187 | 0.1871 |
| 2* | — | 0.2109 | −0.3779 | 0.7122 | 0.9534 |
| 4* | −732.6816 | 0.0807 | −0.0556 | 0.1772 | −3.3823 |
| 5* | 24.4531 | 0.1763 | −0.3262 | 0.6046 | −2.7158 |
| 6* | 2.5019 | −0.1478 | −0.1018 | 0.3678 | −0.0333 |
| 7* | −3.0686 | −0.4700 | 0.4437 | −0.4042 | 0.0897 |
| 8* | −0.7276 | 0.0200 | 0.0187 | −0.0073 | −0.0004 |
| 9* | −32.6155 | −0.1218 | 0.0462 | −0.0146 | 0.0015 |

TABLE 11

| E | F | G | H | J |
|---|---|---|---|---|
| −0.2841 | −0.7610 | 4.1441 | −3.5667 | — |
| −5.8474 | 4.3761 | 1.6023e−007 | 1.6264e−007 | — |
| 1.8561 | 19.8982 | −10.3986 | −77.6479 | — |
| 4.5168 | −5.0080 | 10.1949 | −25.1512 | — |
| −0.7892 | −0.0564 | 2.5573 | −1.2902 | — |
| 0.0861 | −0.0098 | −0.0399 | 0.0161 | — |
| 5.7124e−005 | 2.3769e−005 | 7.8188e−006 | 1.1247e−006 | — |
| 0.0001 | −1.5064e−005 | −1.1257e−005 | −5.6843e−007 | — |

Figure 2A:
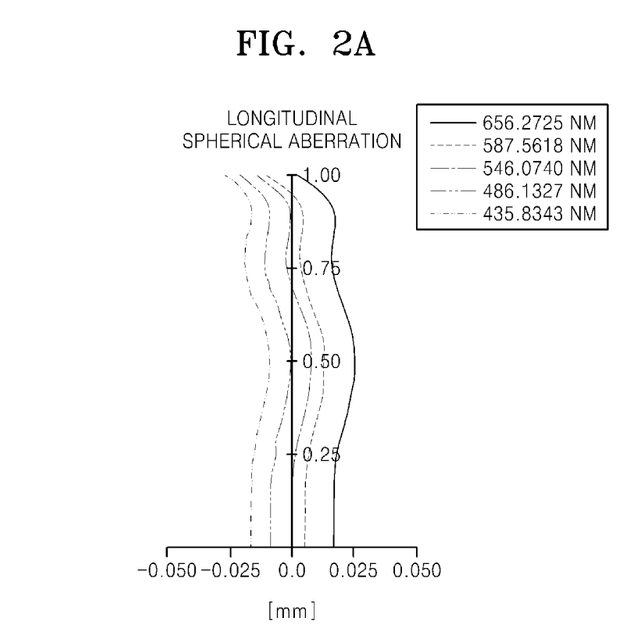
FIGS. 2A through 2C are analysis graphs showing longitudinal spherical aberration, astigmatic field curve, and % distortion of a lens optical system according to an embodiment of the present invention.
Figure 2B:
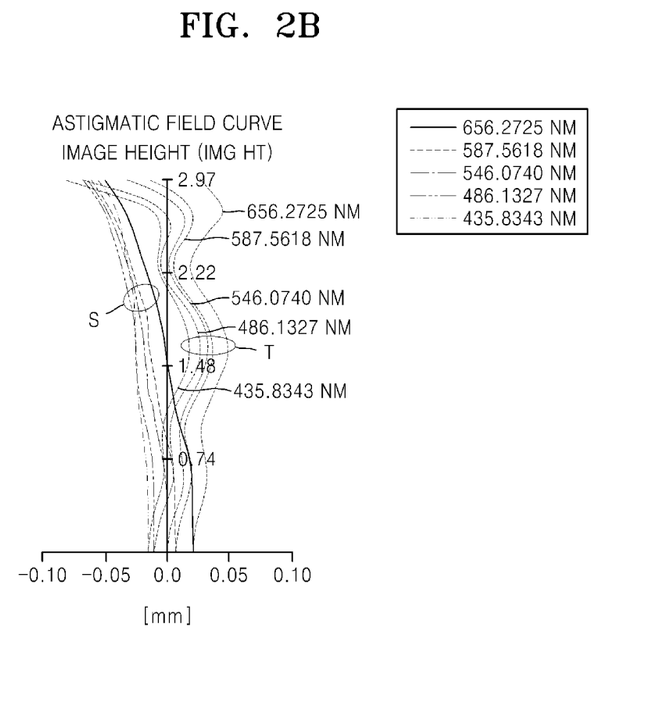
Figure 2C:
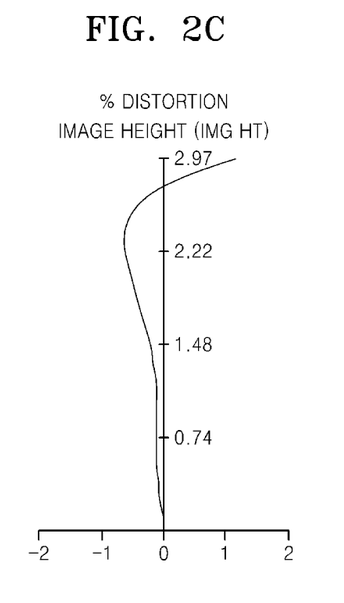

FIGS. 2A through 2C are analysis graphs showing longitudinal spherical aberrations, astigmatic field curves, and % distortion of the lens optical system described with reference to Table 3, Table 4 and Table 5.

FIG. 2A illustrates longitudinal spherical aberration of the lens optical system with respect to light of various wavelengths. That is, spherical aberrations with respect to light of wavelengths 435.8343 mm, 486.1327 mm, 546.0740 mm, 587.5618 mm, and 656.2725 mm are illustrated.

FIG. 2B illustrates astigmatic field curves of the lens optical system with respect to light of various wavelengths, that is, astigmatism between a tangential field curvature T and a sagittal field curvature S. That is, FIG. 2B illustrates astigmatic field curves with respect to light of wavelengths 435.8343 mm, 486.1327 mm, 546.0740 mm, 587.5618 mm, and 656.2725 mm.

FIG. 2C illustrates % distortion of the lens optical system.

Figure 3A:
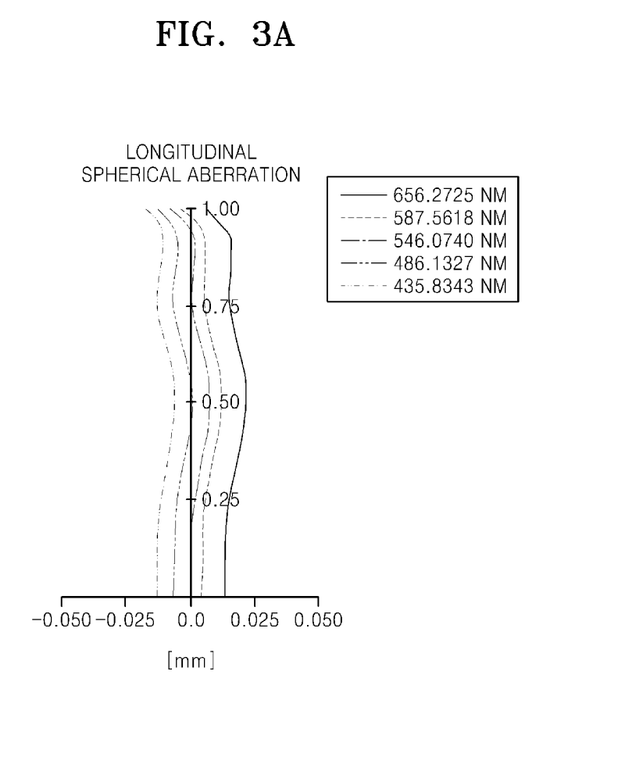
FIGS. 3A through 3C are analysis graphs showing longitudinal spherical aberration, astigmatic field curve, and % distortion of a lens optical system according to another embodiment of the present invention.
Figure 3B:
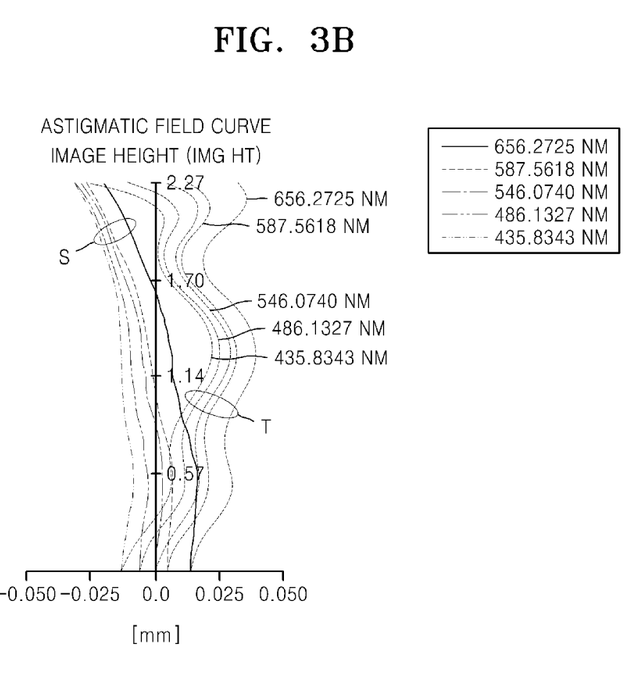
Figure 3C:
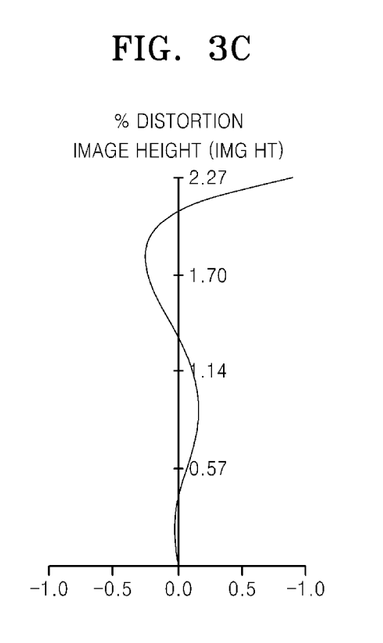

FIGS. 3A through 3C are analysis graphs showing longitudinal spherical aberrations, astigmatic field curves, and % distortion of the lens optical system described with reference to Table 6, Table 7 and Table 8.

FIG. 3A illustrates longitudinal spherical aberrations of the lens optical system with respect to light of various wavelengths. That is, spherical aberrations with respect to light of wavelengths 435.8343 mm, 486.1327 mm, 546.0740 mm, 587.5618 mm, 656.2725 mm are illustrated.

FIG. 3B illustrates astigmatic field curves of the lens optical system with respect to light of various wavelengths, that is, astigmatism between a tangential field curvature T and a sagittal field curvature S. That is, FIG. 3B illustrates astigmatic field curve with respect to light of wavelengths 435.8343 mm, 486.1327 mm, 546.0740 mm, 587.5618 mm, and 656.2725 mm.

FIG. 3C illustrates % distortion of the lens optical system.

Figure 4A:
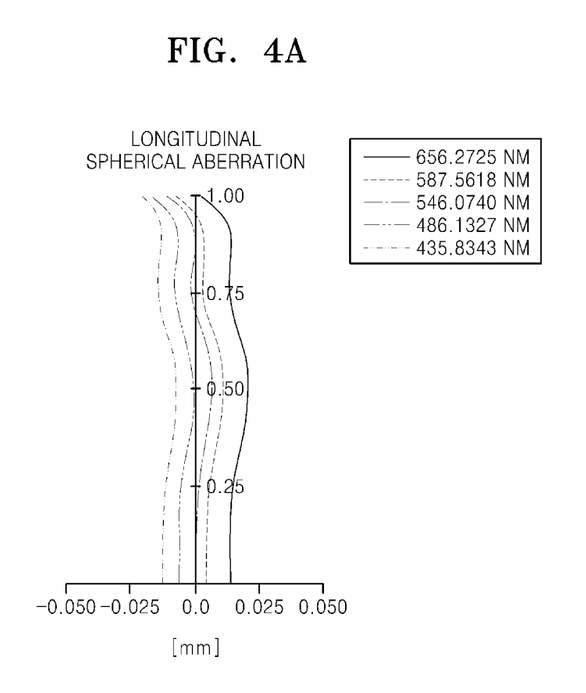
FIGS. 4A through 4C are analysis graphs showing longitudinal spherical aberration, astigmatic field curve, and % distortion of a lens optical system according to another embodiment of the present invention.
Figure 4B:
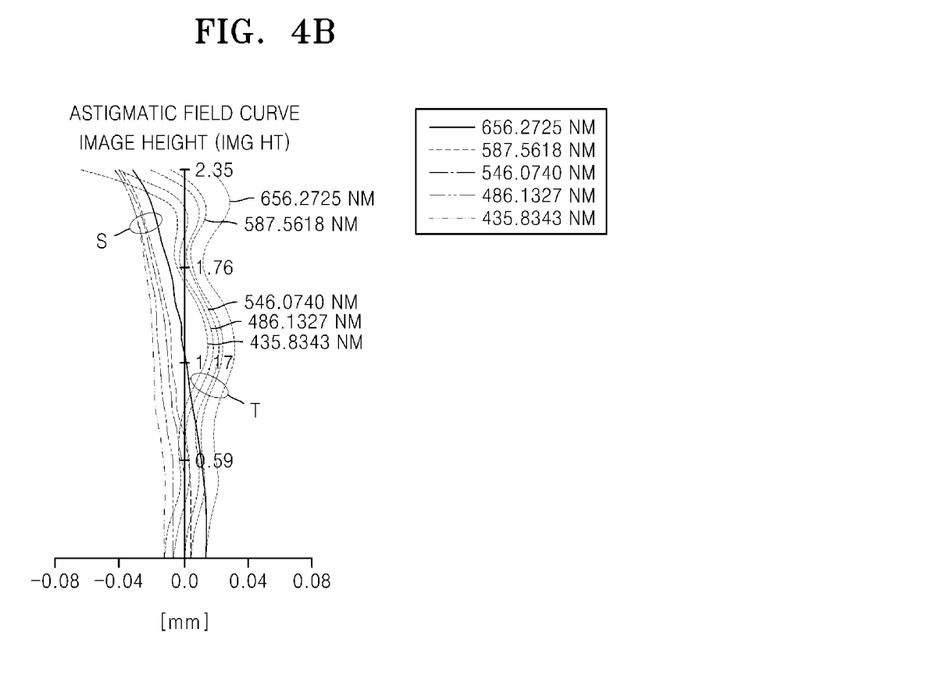
Figure 4C:
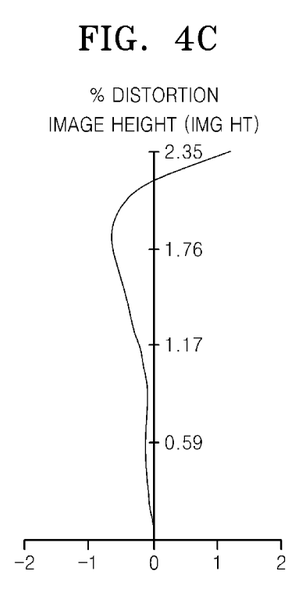

FIGS. 4A through 4C are analysis graphs showing longitudinal spherical aberrations, astigmatic field curves, and % distortion of the lens optical system described with reference to Table 9, Table 10 and Table 11.

FIG. 4A illustrates longitudinal spherical aberrations of the lens optical system with respect to light of various wavelengths. That is, spherical aberrations with respect to light of wavelengths 435.8343 mm, 486.1327 mm, 546.0740 mm, 587.5618 mm, 656.2725 mm are illustrated.

FIG. 4B illustrates astigmatic field curves of the lens optical system with respect to light of various wavelengths, that is, astigmatism between a tangential field curvature T and a sagittal field curvature S. That is, FIG. 4B illustrates astigmatic field curves with respect to light of wavelengths 435.8343 mm, 486.1327 mm, 546.0740 mm, 587.5618 mm, and 656.2725 mm.

FIG. 4C illustrates % distortion of the lens system.

Referring to the analysis graphs shown in FIGS. 2A through 2C, FIGS. 3A through 3C, and FIGS. 4A through 4C, values of images of the lens optical systems having aspherical surfaces according to the embodiments of the present invention are positioned near axes of the graphs, indicating that the lens optical systems show good spherical aberration, astigmatism, and % distortion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens optical system comprising, in a sequence from an object to an imaging device on which an image of the object is formed;
    a first lens having a positive refractive power;
    a second lens having negative refractive power;
    a third lens having a positive refractive power; and
    a fourth lens having a negative refractive power and an incident surface facing the object is concave and an exit surface facing the imaging device has an inflection point;
    wherein focal length f4 of the fourth lens and a height Sh of the fourth lens satisfy the following inequality:

$$1.0 < Sh/|f4| < 2.5$$

2. The lens optical system of claim 1, wherein a focal length f of the lens optical system and a total length TTL, which is a straight-line distance between an incident surface of the first lens and the imaging device, satisfy the following inequality:

$$0.5 < TTL/f < 1.5$$

3. The lens optical system of claim 1, wherein the exit surface of the fourth lens is concave toward the imaging device at a center portion thereof and becomes convex at a portion farther from the center portion toward both boundaries thereof.

4. The lens optical system of claim 1, wherein the first lens is convex toward the object.

5. The lens optical system of claim 4, wherein the first lens is concave toward the imaging device.

6. The lens optical system of claim 1, wherein the second lens is concave toward the object.

7. The lens optical system of claim 6, wherein the second lens is concave toward the imaging device.

8. The lens optical system of claim 1, wherein the third lens is concave toward the object.

9. The lens optical system of claim 8, wherein the third lens is convex toward the imaging device.

10. The lens optical system of claim 1, wherein each of the first through the fourth lenses has at least one aspheric surface.

11. The lens optical system of claim 1, further comprising an aperture that is disposed between the first lens and the second lens and selectively converges light incident from the object.

12. The lens optical system of claim 1, further comprising an infrared blocking unit disposed in front of the imaging device.

13. The lens optical system of claim 1, wherein the first through fourth lenses are formed of plastic.

* * * * *